July 25, 1939.  J. H. GEIER  2,167,567
REVOLVING SPRAY BOOTH AND DRIER
Filed Aug. 1, 1938  4 Sheets-Sheet 1
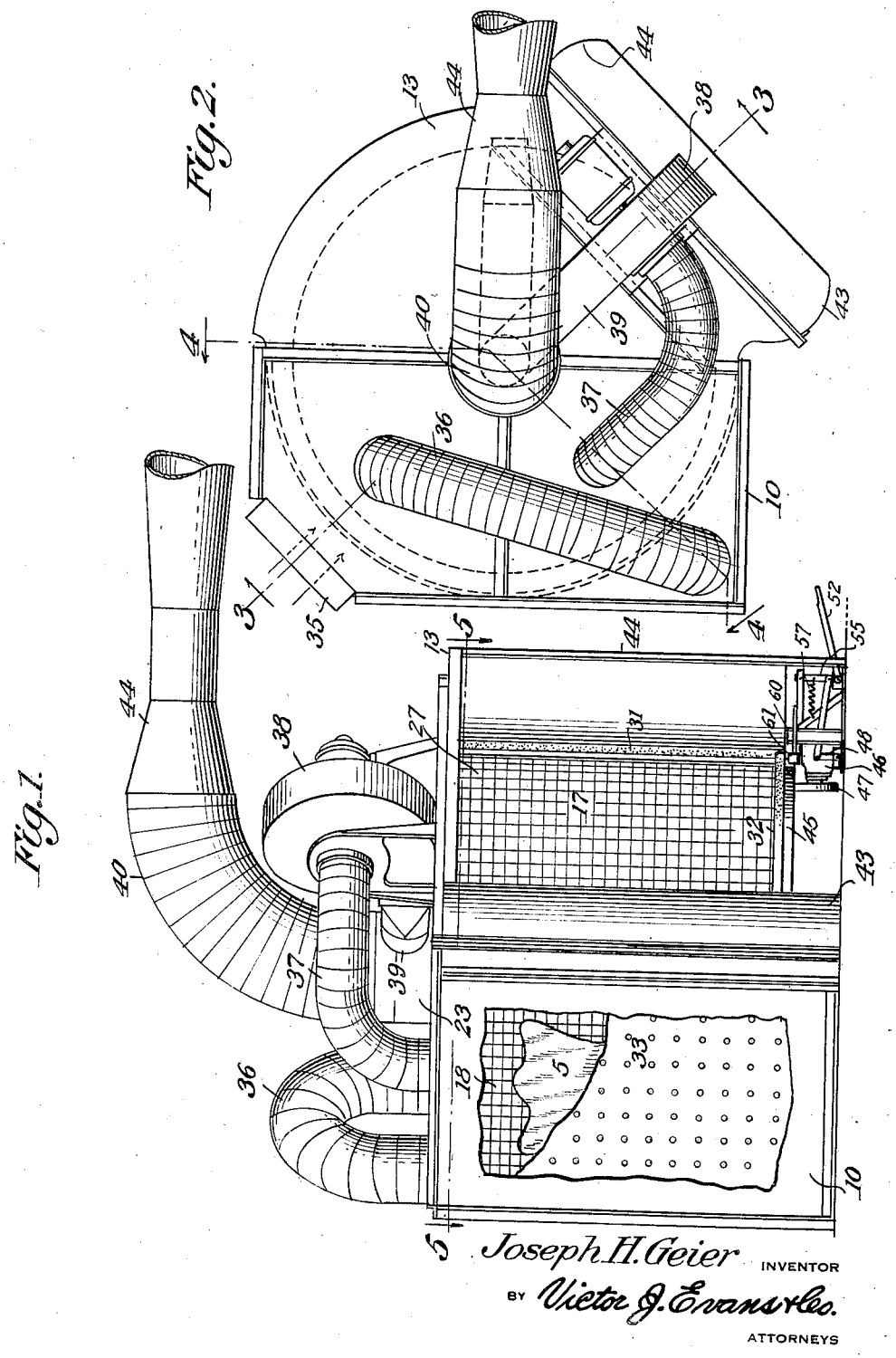
Joseph H. Geier INVENTOR
BY Victor J. Evans & Co.
ATTORNEYS July 25, 1939.  J. H. GEIER  2,167,567
REVOLVING SPRAY BOOTH AND DRIER
Filed Aug. 1, 1938  4 Sheets-Sheet 2
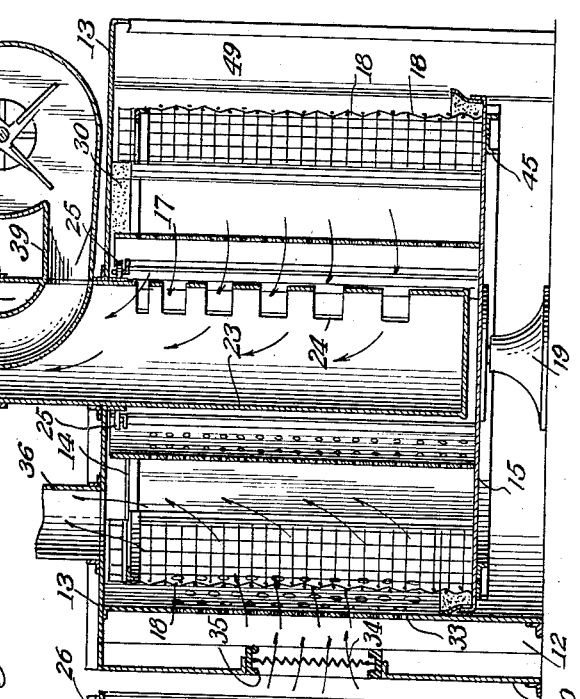
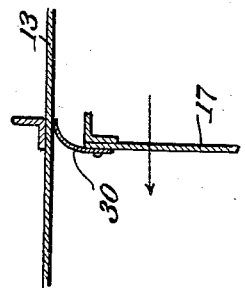
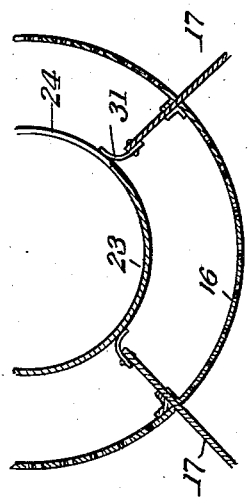
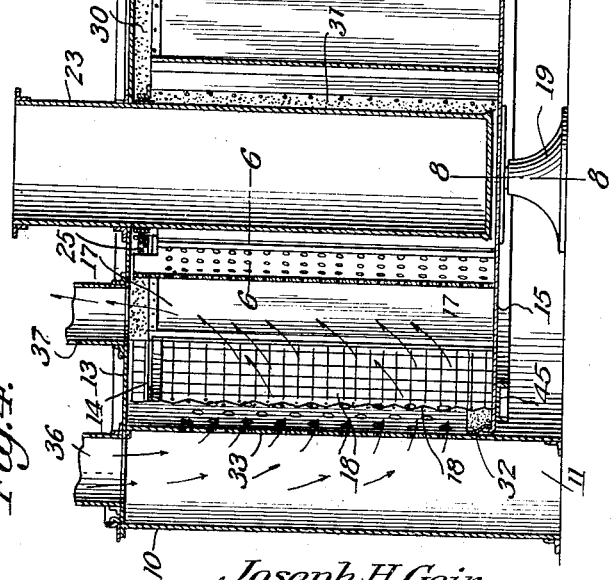
Joseph H. Geir INVENTOR
BY Victor J. Evans & Co.
ATTORNEYS

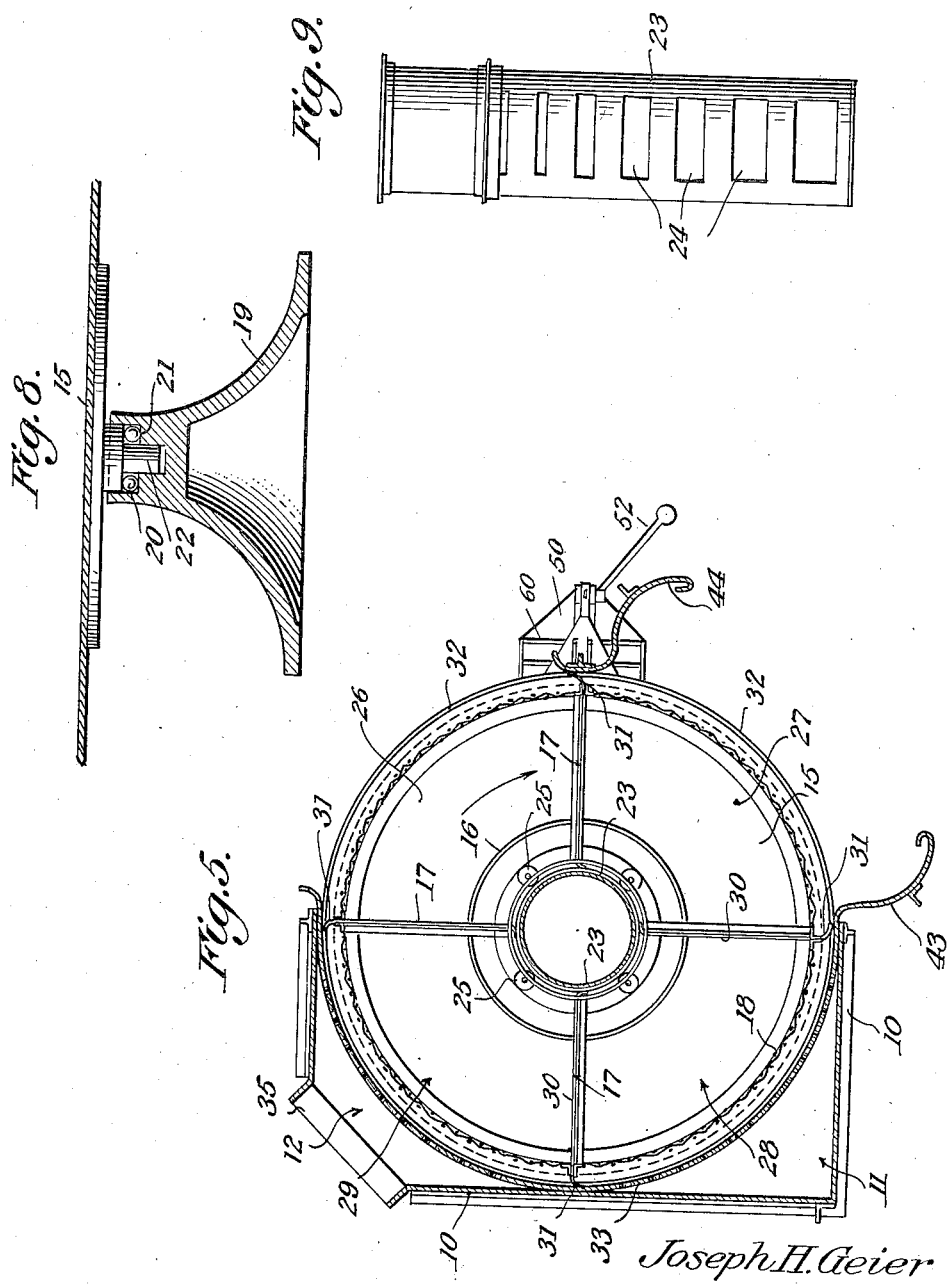

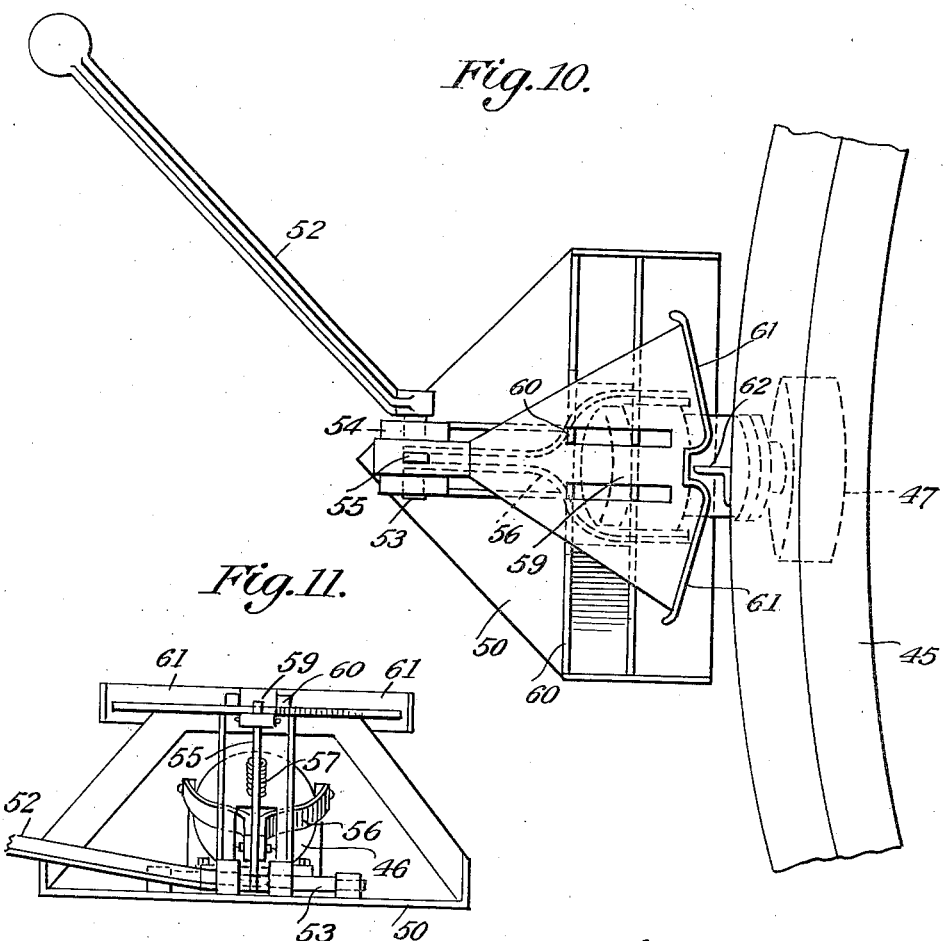
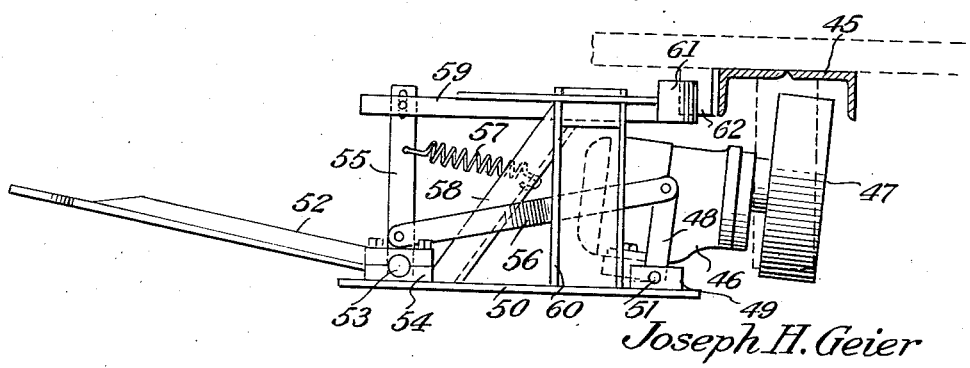

Patented July 25, 1939

2,167,567

UNITED STATES PATENT OFFICE 2,167,567

REVOLVING SPRAY BOOTH AND DRIER

Joseph H. Geier, Milwaukee, Wis.

Application August 1, 1938, Serial No. 222,474

4 Claims. (Cl. 34—19)

This invention relates to a revolving spray booth and drier and has for an object to provide a device of this character constructed somewhat in the nature of a revolving door forming a plurality of booths for processing material, one or more of which is used by the operator for the spraying operation, one or more for placing the work in the booth and removing the same when finished and the others being enclosed booths for drying, to the end that a substantially continuous operation of the spraying equipment will be effected, thus speeding up production to the end that the use of auxiliary drying equipment will be eliminated together with consequent additional labor for handling, and additional floor space for the conventional auxiliary equipment.

A further object is to provide a device of this character which will be formed of a few strong simple and durable parts, which will be inexpensive to manufacture, an which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a revolving spray booth and drier constructed in accordance with the invention.

Figure 2 is a plan view of the spray booth and drier shown in Figure 1.

Figure 3 is a cross sectional view taken on the line 3—3 of Figure 2 and showing the direction of air currents through the drying chambers.

Figure 4 is a cross sectional view taken on the line 4—4 of Figure 2 and also showing the direction of air currents through the device.

Figure 5 is a cross sectional view taken on the line 5—5 of Figure 1 showing parts of the apparatus in top plan.

Figure 6 is a detail cross sectional view taken on the line 6—6 of Figure 4 showing the sealing flaps.

Figure 7 is a detail longitudinal sectional view taken on the line 7—7 of Figure 4 showing the upper sealing flaps.

Figure 8 is a detail longitudinal sectional view taken on the line 8—8 of Figure 4 showing the supporting pedestal and ball bearings.

Figure 9 is a side elevation of the axially disposed stationary exhaust pipe of the work support.

Figure 10 is a plan view of the brake and driving mechanism for the apparatus.

Figure 11 is an end elevation of the parts shown in Figure 10.

Figure 12 is a side elevation of the parts shown in Figure 10.

Referring now to the drawings in which like characters of reference designate similar parts in the various views, 10 designates a vertically walled casing forming two chambers 11 and 12 therein, as best shown in Figure 5. The casing is closed at the bottom by the floor upon which it rests and at the top by a circular top plate 13.

Mounted for rotation about a vertical axis through the chambers 11 and 12 of the casing is a work support comprising a top frame 14 and a bottom circular plate 15. A vertically disposed perforated cylinder 16 is arranged between and connected to the plates. Partitions 17 extend radially through the cylinder 16 and at the outer ends are connected to a reticulate drum 18, connected to the plates 14 and 15 outside of and coaxial with the casing. The inner ends of the partitions confront and are spaced from a stationary exhaust pipe later described.

The work support is rotatably mounted upon a pedestal 19, there being ball bearings 20 mounted in a race 21 on the pedestal, as best shown in Figure 8, to receive the weight of the work support. A stub shaft 22 is connected to the bottom plate 15 at the center thereof to rotatably mount the work support on the pedestal.

Arranged axially in the hollow cylinder 16 is a stationary exhaust pipe 23 which is closed at the bottom and is provided with intake openings 24 arranged in a vertical row in one side. Rollers 25, best shown in Figure 5, carried by the frame 14 of the work support, engage the exhaust pipe to provide anti-friction bearings between the exhaust pipe and the work support during rotation of the latter.

As best shown in Figure 5 the partitions divide the work support into a service chamber 26 where the material to be treated, such as a skin 5 shown in Figure 1, is applied to the reticulate drum 18, a spraying chamber 27 where the skin is sprayed, a preliminary heating chamber 28, where the skin is subjected to a warm air blast, and a final heating chamber 29 where the skin is thoroughly dried before rotation of the work support carries the skin to its initial position for removal and replacement with a fresh skin to be treated.

The partitions are provided on the upper edges with flexible flaps 30, best shown in Figure 7, to engage against the top plate 13 of the casing. The vertical longitudinal edges of the partitions are provided with flaps 31, best shown in Figure 6, to engage against the pipe 23. As best shown in Figure 4, the bottom plate is provided with a circular flap 32 which is engaged against a semicylindrical perforated shell 33 which is arranged in the heating compartments 28 and 29. The flaps 30, 31 and 32 seal the heating compartments so that the air currents will be directed therethrough in a predetermined path as will now be described.

As best shown in Figure 3, a heating unit 34 is mounted in an air inlet opening 35 formed in the casing at the chamber 12. Air drawn in through the opening is heated and passes through the perforations in the shell 33 to effect the final drying stage of a sprayed skin.

As best shown in Figures 1 and 2, the pipe 36 passes horizontally above the top plate 13 and enters the top of the initial drying chamber 28 outside of the reticulate drum 18, in which compartment hot air passes through the perforations in the shell 33 and against the skin suspended upon the reticulate drum 18 to dry the skin just after it has been sprayed and is very wet.

A pipe 37 enters the top plate 13 and enters the initial chamber 11 outside of the reticulate drum 18 and is connected to a blower 38 which induces an air current in the direction of the arrowheads through the final drying chamber 29, and initial drying chamber 28.

An outlet pipe 39 for the blower is directed axially through a curved extension 40 on the non-rotatable exhaust pipe 23 above the top plate 13. The outlet pipe 39 terminates in a conical jet tip 41 which is disposed axially in a similarly reduced portion 42 on the exhaust pipe extension 40. The air jetted from the tip 41 creates a suction in the exhaust pipe 23 to pull in air, as shown by the arrowheads in Figure 3, through the reticulate drum 18 and perforated cylinder 16 for the purpose of drawing the spray from a sprayer (not shown) over the skin in the spray chamber of the casing which chamber is formed through the medium of splash plates 43 and 44 secured respectively to the casing 10 and to the top plate 13, as best shown in Figures 2 and 3.

For rotating the work support through a 90 degree step rotation (in the case of a 4-chamber unit) in order to locate the skin successively in position for the various operations, a combined brake and driving mechanism is assembled with the apparatus, as best shown in Figures 1, 10, 11 and 12.

By referring to Figure 12 it will be seen that a circular track 45 is disposed on the bottom plate 15 concentric with the axis of rotation of the work support. An electric motor 46, having a friction pulley 47, is secured to an L-shaped bracket 48 which is pivotally mounted at its elbow between stationary hinge ears 49 carried by a base plate 50. The free arm of the bracket 48 forms a crank arm through the medium of which the motor is swung on its pivot 51 to engage the friction pulley with the track to rotate the work support. (The motor may be omitted if manual rotation is desired.)

A pedal 52 is pivotally mounted as shown at 53 upon a bracket 54 carried by the base plate and is provided with an upstanding crank arm 55 which is connected to the motor through the medium of a link 56. Upon the pedal being depressed the friction pulley of the motor will be swung into engagement with the track. Upon release of the pin, a spring 57 returns the pulley to initial position, the spring being connected at one end to the crank arm 55 and at the opposite end to a stationary brace 58.

For stopping the rotation at each 90 degree step movement (in the case of a 4-chamber unit) and simultaneously disengaging the friction pulley 47 from the track, a horizontally disposed brake arm 59 is pivotally connected at the outer end to the upper end of the crank arm 55. The brake arm is slidably fitted in a guide bracket 60 disposed rearwardly of the motor. The brake arm 59 is provided at the free end with a pair of oppositely extending cam fingers 61 one of which is engaged by an angular finger 62 projecting laterally from the track to press back the brake arm until the angular finger 62 can ride into the space between the fingers 61 and be held there since the spring 57 returns the brake arm to initial position after the angular finger 62 has moved into the space between the fingers 61. The work support is thus halted at the end of a 90 degree angular advance movement (in the case of a 4-chamber unit) and remains in this position until the operator depresses the pedal 52.

Simultaneously with the return of the brake arm 59 to initial position the crank arm 55 will move the link 56 to rock the motor on its pivot and disengage the friction roller 47 from the track.

In operation the operator attaches the material to be treated such as a skin, to the reticulate drum 18 when the drum is in its initial position. Thereupon the drum is rotated through a 90 degree advance movement (in the case of a 4-chamber unit) to dispose the skin in the spraying compartment between the splash plates 43 and 44. Here the skin is sprayed, the blower meanwhile sucking air past the skin during the spraying thereof. The work support is now rotated through another 90 degree advance movement to locate the sprayed skin in the initial drying chamber while the next succeeding skin is being sprayed. The work support is then rotated through another 90 degree advance movement to dispose the partly dried skin in the final drying chamber where all moisture is removed. The next 90 degree advance movement of the work support advances the dried skin into initial position for removal and replacement with a fresh skin to be treated.

From the above description it is thought that the construction and operation of the invention will be fully understood without further explanation.

What is claimed is:

1. A revolving spray booth and drier comprising a casing, a work support mounted within the casing for rotation about a vertical axis and having radially disposed partitions dividing the casing into a service chamber, a spraying chamber, a preliminary drying chamber, and a final drying chamber, the casing having openings in the front of the spraying chamber and in the front of the service chamber, sealing means between the work support and the casing, a source of heated air communicating with the final drying chamber, a pipe disposed above the casing and communicating with the final drying chamber, and with the initial drying chamber, an exhaust blower having its intake connected with the initial drying chamber, and a stationary exhaust pipe at the center of the work support connected with the exhaust blower and having inlet openings communicating solely with the spraying chamber.

2. The structure recited in claim 1 and in which the sealing means comprises flexible flaps carried by the top and vertical outer edges of the partitions, and an annular flap carried by the bottom edges of the partitions.

3. A revolving spray booth and drier comprising a casing, a work support mounted within the casing for rotation about a vertical axis and having radially disposed partitions dividing the casing into a service chamber, a spraying chamber, a preliminary drying chamber, and a final drying chamber, the casing having openings in the front of the spraying chamber and in the front of the service chamber, sealing means between the work support and the casing, a source of heated air communicating with the final drying chamber, a pipe disposed above the casing and communicating with the final drying chambers and with the initial drying chambers, an exhaust blower having its intake connected with the initial drying chamber, and a stationary exhaust pipe at the center of the work support having a jet nozzle in the air stream expelled by the exhaust blower and having inlet openings communicating solely with the spraying chambers.

4. A revolving spray booth and drier comprising a casing, a work support including top and bottom plates and radially disposed partitions, a pedestal mounting said work support in the casing to rotate upon a vertical axis, a reticulate drum connected to the outer vertical edges of the partitions, a perforated cylinder connected to the partitions near the inner edges thereof, said partitions extending through said perforated cylinder, a stationary exhaust pipe disposed axially in the work support between the inner ends of the partitions, rollers on the inner ends of the partitions engaging said exhaust pipe, said partitions dividing the work support into a service chamber, a spraying chamber, a preliminary drying chamber, and a final drying chamber, the casing having openings in the front of the spraying chamber and in the front of the service chamber, sealing flaps carried by the partitions and engaging the inner walls of the casing, a source of heated air communicating with the final drying chamber, a pipe disposed above the casing and communicating with the final drying chamber and communicating with the initial drying chamber, an exhaust blower having its intake connected with the initial drying chamber, an outlet pipe for the blower having a conical constricted portion, and an extension on the stationary exhaust pipe having a conical tip disposed within said portion and adapted to be accelerated by the expelled air from the blower to suck air from the spraying chamber through the openings in the stationary exhaust pipe.

JOSEPH H. GEIER.